INVENTOR.

WALTER GRESCH

_United States Patent Office_

3,518,778
Patented July 7, 1970

3,518,778
APPARATUS FOR IMPROVING HEAT EXCHANGE BETWEEN A GASEOUS CARRIER MEDIUM AND SOLIDS SUSPENDED THEREIN
Walter Gresch, Muttenz, Switzerland, assignor to Buss Aktiengesellschaft, Basel, Switzerland, a corporation of Switzerland
Filed Jan. 18, 1968, Ser. No. 702,496
Claims priority, application Germany, Jan. 24, 1968, 90,861
Int. Cl. F26b 17/10
U.S. Cl. 34—57                                    4 Claims

ABSTRACT OF THE DISCLOSURE

Apparatus for heat exchange between a gaseous carrier medium flowing in a duct and solids suspended therein which comprises means for artificially increasing the relative velocity between the solids and the gaseous medium at least at one point in the duct in which the gaseous carrier medium and the solids flow, and a decelerating and re-accelerating means in said duct for artificially increasing the relative velocity between said gaseous carrier medium and said solids at least at one point. The decelerating and re-accelerating means includes an open-ended chamber having a diameter larger than that of the duct into which it is installed, said chamber having a coned inlet which decelerates the flow of carrier medium due to expansion of the diameter of flow and a coned outlet which re-accelerates the flow due to contraction of the diameter of flow at the point where the carrier medium leaves the expanded diameter to return to the duct system. Braking and deflecting devices may be provided in the chamber and swirling devices may be installed in the duct upstream of the chamber inlet.

BRIEF SUMMARY OF THE INVENTION

It is the object of the present invention to provide a means for improving heat exchange between a gaseous carrier medium flowing in a duct and solids suspended in said medium. More particularly the invention concerns flowing media comprising gaseous and solid phases, the latter being entrained and conveyed by the former. The proposed heat exchange means specifically involves drying of pulverulent or granular particulate materials entrained by and suspended in a flowing gas. Alternatively the object may be to cool or heat the solid particles.

To attain this object, the present invention provides apparatus for artificially increasing the relative velocity between the solids and the gaseous medium at least at one point in the duct in which the gaseous carrier medium and the solids flow, and a decelerating and re-accelerating means in this duct for artificially increasing the relative velocity between said gaseous carrier medium and said solids at least at one point.

BRIEF DESCRIPTION OF THE DRAWING

An embodiment of the invention will now be described by way of example and with reference to the accompanying schematic drawing, in which.

DESCRIPTION OF THE PREFERRED EMBODIMENTS

Figure 1:
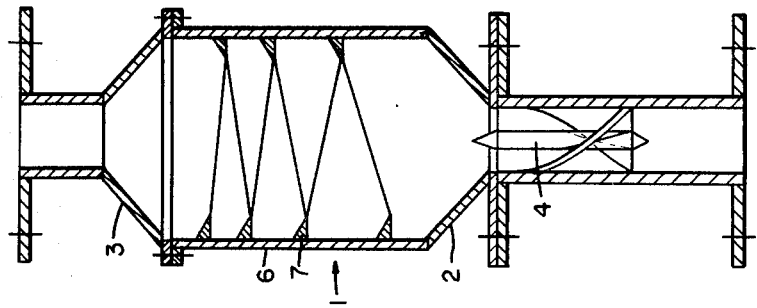
FIG. 1 is a longitudinal section through an apparatus according to the invention illustrating a braking helix, a swirling inlet and a coned outlet.

With reference to FIG. 1 there is shown the installation in a duct system of given diameter of an open-ended chamber 1 having a larger diameter than the duct and it is within said chamber 1 that a gas conveying solids is continuously decelerated and re-accelerated and said chamber 1 may be equipped with heating or cooling means not shown in the drawing. The chamber 1 has a coned inlet section 2 joined to the duct portion of the duct system shown at the bottom of FIG. 1 and a coned outlet section 3 which may be joined to another section of the duct which would be at the top of FIG. 1, the coned inlet section 2 being preceded by a swirl-generating member 4. This swirl-generating member 4 may have the form of a sheet metal helix which imparts a rotary motion to the air and to the solid particles passing through the chamber 1 in the direction indicated by arrow 5. The rotation direction may be cyclically reversed. The solids which impinge upon the wall are braked by friction and subsequently re-accelerated by the increased velocity of the air, as it passes through the converging outlet section 3. Moreover, for achieving a particularly pronounced braking effect, it may be useful to affix to the wall of the cylindrical centre section 6 of the chamber decelerating elements in the form of single or multiple braking helices 7 of decreasing pitch. If the volume of the entraining air is appropriately reduced, a nearly stationary fluidized layer of solids can thus be formed.

Figure 2:
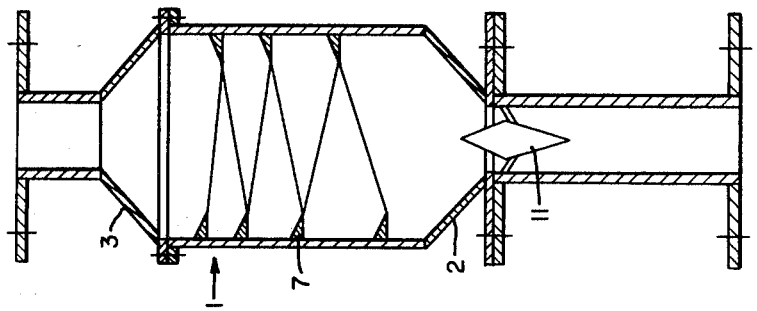
FIG. 2 is a longitudinal section through an embodiment similar to FIG. 1, including a coned displacer at the inlet for swirling.

FIG. 2 illustrates a modification of the above-described apparatus which comprises an opened-ended chamber 1 provided with a coned inlet section 2, multiple braking helices 7 and a coned outlet section 3 for decelerating and re-accelerating the gas conveying solids. However, instead of the swirl generating element 4, a cone-shaped displacer member 11 is placed at the inlet section to create the swirling movement. The effect of the cone-shaped displacer 11 is to propel the moving solid particles entrained by the gas against the wall of the chamber 1 where they are braked.

Figure 3:
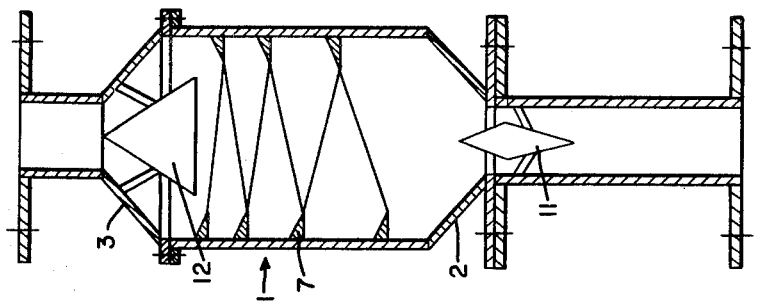
FIG. 3 is a longitudinal section through an embodiment similar to FIG. 1, including a baffle cone at the outlet.

FIG. 3 illustrates a chamber 1 of construction similar to FIGS. 1 and 2, but differing from the arrangement shown in FIG. 2 in that a baffle cone 12 is located in the region of the outlet section 3 for braking and deflecting the entering fast moving solid particles entrained by the gas.

In accordance with the invention, several chambers may be associated in tandem in the duct for further improving the heat exchanging effect.

The described apparatus can be used with particularly good effect for continuously drying, cooling and heating of granular materials.

The invention may be embodied in other specific forms without departing from the spirit or essential characteristics thereof. The present embodiments therefore are to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for improving heat exchange between a gaseous carrier medium flowing in a duct system of a given diameter and solids suspended in said medium, comprising:
   (a) a decelerating and re-accelerating means in said duct for artificially increasing the relative velocity between said gaseous carrier medium and said solids at least one point;
   (b) said decelerating and re-accelerating means having an open-ended chamber of cylindrical section with a diameter larger than the diameter of said duct;

(c) a coned inlet connecting the duct system to the chamber which decelerates the flow;

(d) a coned outlet which accelerates the flow due to contraction of the diameter of flow to the duct system from the chamber outlet; and (e) at least one helix which is provided on the inside surface of the cylindrical section of said chamber to cause a braking action of the gaseous medium and the solids suspended therein in said chamber.

2. An apparatus as claimed in claim 1, wherein a swirl generating element is provided in the duct system at the inlet section of the chamber to create a swirling movement of the gaseous carrier medium and solids suspended therein as they enter said chamber.

3. An apparatus as claimed in claim 1, wherein a cone-shaped member is provided in the duct system at the inlet section of the chamber to swirl and propel the gaseous medium and the solids suspended therein against the inner wall of said chamber.

4. An apparatus as claimed in claim 1, wherein the coned outlet section of the chamber is provided with a baffle cone braking means which deflects the gases exiting from the chamber into the duct.

References Cited

UNITED STATES PATENTS

| | | |
|---|---|---|
| 2,363,281 | 11/1944 | Arnold. |
| 2,538,833 | 1/1951 | De Rycke. |
| 2,903,800 | 9/1959 | Skoglund. |
| 2,924,887 | 2/1960 | Marshall. |
| 3,267,586 | 8/1966 | Molstedt et al. |

FREDERICK L. MATTESON, JR., Primary Examiner

R. A. DUA, Assistant Examiner